June 16, 1931.  C. R. UEBELMESSER ET AL  1,810,879
ENGINE SUPPORT
Filed Feb. 7, 1928  2 Sheets-Sheet 1
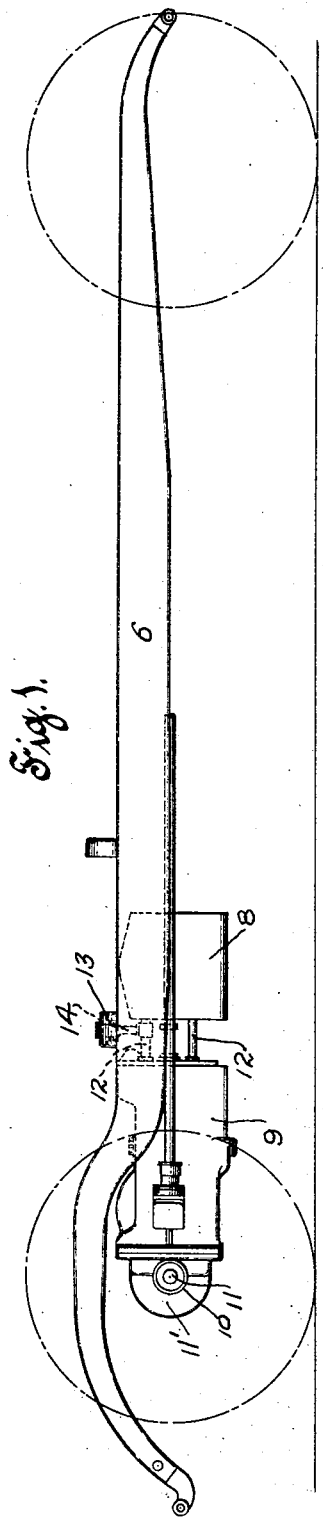
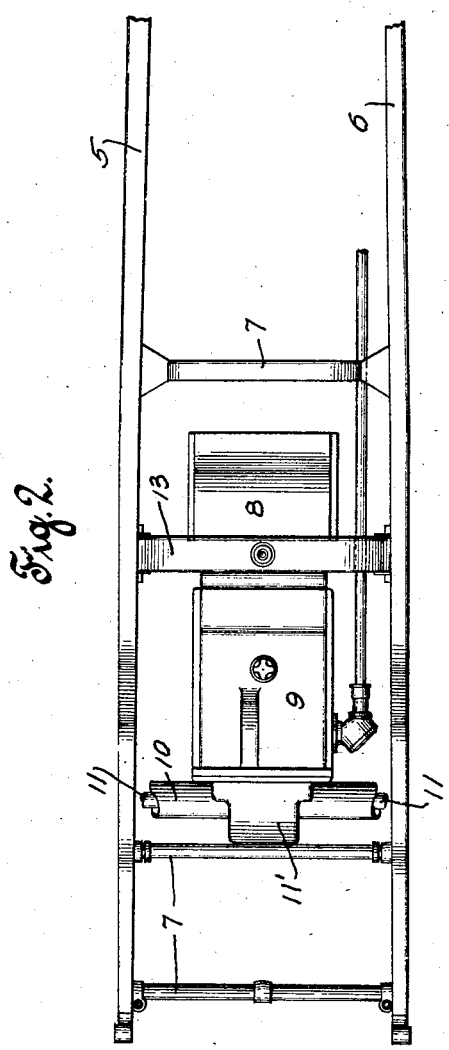
INVENTORS.
C. R. Uebelmesser &
Wm. Wenderhold
BY
Mitchell Bechert
ATTORNEYS.

June 16, 1931. C. R. UEBELMESSER ET AL 1,810,879
ENGINE SUPPORT
Filed Feb. 7, 1928 2 Sheets-Sheet 2

INVENTORS
C. R. Uebelmesser
Wm. Wenderhold
BY Mitchell Bechert
ATTORNEYS.

Patented June 16, 1931

1,810,879

UNITED STATES PATENT OFFICE

CHARLES R. UEBELMESSER AND WILLIAM WENDERHOLD, OF NEW YORK, N. Y., ASSIGNORS TO ELIZABETH M. UEBELMESSER, OF NEW YORK, N. Y.

ENGINE SUPPORT

Application filed February 7, 1928. Serial No. 252,456.

Our invention relates to an engine and its supporting means, and more particularly to a steam engine for an automobile.

At the present time it is usual to rigidly support an automobile engine on the automobile frame. During the operation of the automobile, twisting strains are often placed upon the frame and consequent strains are placed upon the engine secured thereto. With such rigidly supported engines it is also necessary to connect the crank shaft with the running gear by means of a propeller shaft, including a universal joint.

It is the general object of our invention to improve the method of supporting an engine from an automobile frame to minimize strains on the engine due to tendencies of the frame to be distorted during the operation of the automobile.

It is a more specific object to provide an engine which may be attached directly to an axle housing and suspended from the frame.

It is another object to provide an engine and means for supporting the same from the frame but permitting substantial relative movement between the engine and frame.

In the drawings which show, for illustrative purposes only, a preferred embodiment of the invention—

Fig. 1 is a view in side elevation of an automobile frame and attached engine, illustrating features of the invention;

Fig. 2 is a fragmentary plan view of parts shown in Fig. 1;

Figure 3:
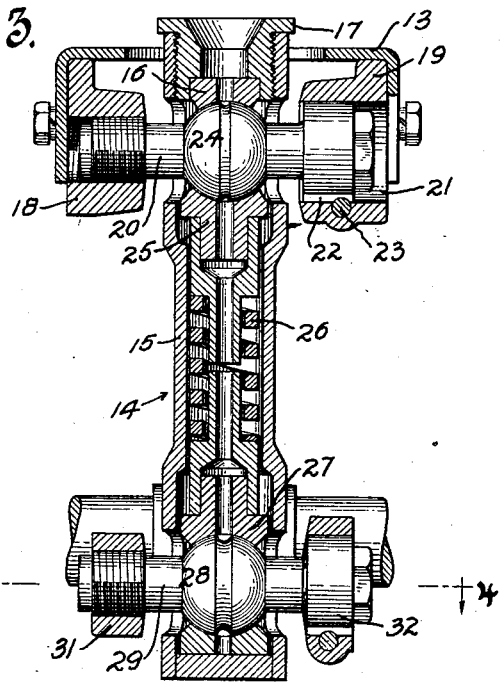
Fig. 3 is a sectional view of an improved means for suspending an engine.
Figure 4:
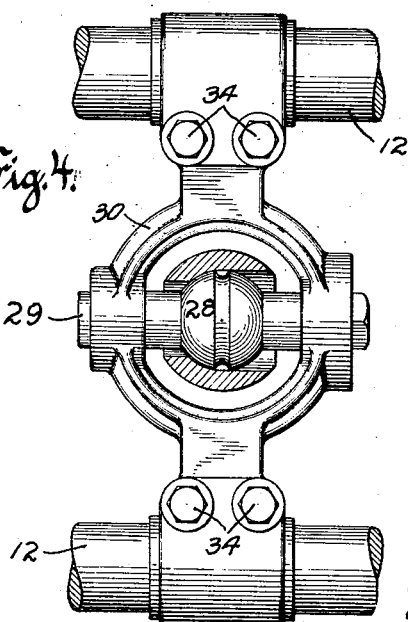
Fig. 4 is a fragmentary sectional view, taken substantially in the plane of the line 4—4 of Fig. 3.

In said drawings, 5—6 indicate longitudinal side members of an automobile frame. These frame members, as usual, may be connected to each other as by means of cross members 7—7. Instead of rigidly attaching the engine to the chassis or frame, we contemplate a relatively loose connection between the frame and the engine while still securely supporting the same therefrom. In the form shown, 8 indicates the cylinder block of a steam engine, which may include one or more cylinders. 9 indicates generally the crank case end of a steam engine which, as usual, includes a cross head and crank, as will be readily understood. The crank case end 9 of the engine is preferably rigidly secured to an axle housing 10 or a suitable extension housing 11' secured thereto. By securing the crank case end of the engine directly to the axle housing, it is possible to form a direct connection between the engine shaft and the axles 11—11, or usually, to the ring gear of a differential connected to the axles. The axle housing 10 may be supported from the frame by means of springs, as is usual in automobile construction. Thus, during the operation of the automobile, the axles, axle housing and crank case end of the engine move relatively to the frame when the automobile is passing over obstructions encountered in a road.

The cylinder block 8 forms a part of, or, in the particular form illustrated, is secured to the crank case end of the engine, as by means of connecting bars 12—12, so as to make the engine a substantially rigid unit. By making the cylinder block and the crank case end separate and rigidly securing the same together, the taking down of the engine is considerably facilitated and the parts may be more easily manufactured.

It will be clear that, with the crank case end rigidly secured to the axle housing, the engine must partake of such movement as is imparted to the axle housing. We therefore secure one part of the engine to the frame by means of a loose connection. In the form shown, a part of the engine removed from the crank case is suspended from the frame, and we prefer to make the point of suspension between the cylinder block and the crank case end. This suspension means may take various forms and be variously embodied. As illustrated, we employ what may be termed a chassis cross member 13, which may be of channel section and secured to the side frame members 5—6 in any suitable manner. The suspending means, designated generally 14, may be secured to one or more of the connecting bars 12—12, when such bars are provided for holding the crank case end and cylinder block together. The suspension member may consist of a tube 15, having an upper cup bearing 16 and a lower cup bearing 16a, the upper cup bearing in the form shown being held in by a nut 17. The chassis cross piece, as illustrated, is provided with two boss members 18—19 secured thereto. A bearing pin 20 may be threaded into the boss 18 at one end, and the opposite end may be received in a smooth bore 21 in the boss 19. Suitable means, such as a key 22, may be inserted so as to prevent rotation of the bearing pin 20 in the boss 19. The boss 19 may be split, so as to permit easy rotation of the pin 20 during assembly and, when in place, a bolt, such as 23, may serve to clamp the head in the bore 21. At the point where the pin 20 passes through the tube 15 a spherical surface or ball 24 may be formed, so as to fit a correspondingly formed seat in the bearing plug 16. Thus, a universal joint is formed at this point. A second spherically formed seat plug 25 may bear against the lower end of the ball 24 and be urged upwardly against the ball 24, as by means of a coil spring 26. The lower end of the spring 26 may urge another seat plug 27 onto the ball 28 on a second bearing pin 29 at the lower end. The ball 28, at its bottom side, fits the seat in the plug 16a in much the same manner as that described in connection with the upper part. The pin 29 may be held in a cross ring 30 in a manner similar to that described above, that is to say, one end of the pin 29 may be threaded into a bore 31, and the opposite end 32 may be held in a smooth bore. The ring 30 is preferably secured, as by means of bolts 34—34 to the two connecting bars 12—12, which serve to secure the cylinder block to the crank case end of the engine.

It will thus be seen that, by suspending the engine on a movable suspender, such as the ball and socket joints of the device described, the engine will be suspended, but may accommodate itself to such movements as are imparted to it by the relative movement between the axle housing and the automobile frame. Thus the engine, as a unit, is relieved of much of the strain which would otherwise come thereon, due to the distorting tendencies of the chassis frame members during operation of the automobile.

While the invention has been described in considerable detail and one specific embodiment illustrated, it is to be understood that various changes and modifications may be made within the scope of the invention as defined in the appended claims.

We claim:

1. In a device of the character described, an engine having a crank case and cylinder, rods between said crank case and cylinder, said crank case having means for supporting the same from an axle housing, and a link having ball and socket joints at opposite ends, one end of the link adapted to be attached to an automobile frame and the other end to one of said rods between said crank case and cylinder.

2. In a device of the character described, an engine having a crank case and a cylinder, rods connecting said crank case and cylinder, means for securing the crank case to an axle housing, and means for flexibly suspending said engine from an automobile frame at a point removed from the axle housing, said means including a link having ball and socket joints at opposite ends, one end of said link being attached to said frame and the other end to one of said rods between said crank case and cylinder.

3. In a device of the character described, an engine having a crank case and cylinder, rods between said crank case and cylinder, said crank case having means for supporting the same from an axle housing, a link having ball and socket joints at opposite ends, transversely extending shafts engaging said joints, one of said shafts adapted to be attached to an automobile frame, and the other shaft being adapted for attachment to one of said rods between said crank case and cylinder.

4. An articulated suspending device for engines comprising in combination, a tubular link having ball seats at its opposite ends, transversely extending shafts having ball portions thereon engaging said bearings, and a spring within said tube holding said bearings in spaced apart position, whereby an engine may be suspended from an automobile frame by engagement of said frame and engine with said shafts.

5. An articulated suspending device for engines comprising in combination, a tubular link having ball seats at its opposite ends, transversely extending shafts passing through said tubular link and having ball portions thereon engaging said bearings, a spring within said tube holding said bearings in spaced apart position, whereby an engine may be suspended from an automobile frame by engagement of said frame and engine with said shafts.

6. In a device of the character described, an engine having a crank case and cylinder, said crank case having means for supporting the same from an axle housing, a link having ball seats at its opposite ends, a spring for holding said ball seats apart, and ball means coacting with said ball seats and attached respectively to an automobile frame and to said engine for suspending said engine at a point removed from the axle housing.

CHARLES R. UEBELMESSER.
WILLIAM WENDERHOLD.